United States Patent
Pavlyushchik

(10) Patent No.: US 8,650,650 B1
(45) Date of Patent: Feb. 11, 2014

(54) SYSTEM AND METHOD FOR SELECTING SYNCHRONOUS OR ASYNCHRONOUS FILE ACCESS METHOD DURING ANTIVIRUS ANALYSIS

(71) Applicant: Kaspersky Lab ZAO, Moscow (RU)

(72) Inventor: Mikhail A. Pavlyushchik, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/841,116

(22) Filed: Mar. 15, 2013

(30) Foreign Application Priority Data

Dec. 25, 2012 (RU) ................................ 2012156434

(51) Int. Cl.
*G06F 11/00* (2006.01)

(52) U.S. Cl.
USPC ............................................. 726/24; 726/22

(58) Field of Classification Search
USPC .................. 726/22–25; 713/187–189, 193
See application file for complete search history.

(56) References Cited

U.S. PATENT DOCUMENTS

| | | | |
|---|---|---|---|
| 6,594,686 B1 | 7/2003 | Edwards et al. | |
| 7,293,177 B2 * | 11/2007 | Lahti et al. | 713/188 |
| 7,681,237 B1 | 3/2010 | Spiegel et al. | |
| 8,122,507 B1 | 2/2012 | Andruss et al. | |
| 2004/0068664 A1 * | 4/2004 | Nachenberg et al. | 713/200 |
| 2004/0230794 A1 | 11/2004 | England et al. | |
| 2005/0283603 A1 | 12/2005 | Raman et al. | |
| 2006/0288416 A1 | 12/2006 | Costea et al. | |
| 2009/0094698 A1 * | 4/2009 | Nichols et al. | 726/24 |
| 2011/0083176 A1 | 4/2011 | Martynenko et al. | |
| 2011/0296525 A1 * | 12/2011 | Turbin | 726/23 |

* cited by examiner

*Primary Examiner* — Nirav B Patel
(74) *Attorney, Agent, or Firm* — Arent Fox LLP; Michael Fainberg

(57) ABSTRACT

Disclosed are systems, methods and computer program products for performing antivirus analysis of a file. Particularly, antivirus software detects an attempt to execute a file on a computer and collects information about current file attributes. The software retrieves information about old file attributes. The software then compares current file attributes with the old file attributes to determine whether the file has been modified. When the file is determined to be modified, the software synchronously accesses the file to perform antivirus analysis thereof. During the synchronous access of the file, one or more other programs are prohibited from accessing the analyzed file. When the file is determined to be unmodified, the software asynchronously accesses the file. During the asynchronous access of the file one or more of the other programs are allowed to access the analyzed file.

18 Claims, 5 Drawing Sheets

SYSTEM AND METHOD FOR SELECTING SYNCHRONOUS OR ASYNCHRONOUS FILE ACCESS METHOD DURING ANTIVIRUS ANALYSIS

CROSS-REFERENCE TO RELATED APPLICATIONS

This application claims benefit of priority under 35 U.S.C. 119(a)-(d) to a Russian Application No. 2012156434 filed on Dec. 25, 2012, which is incorporated by reference herein.

TECHNICAL FIELD

The present disclosure generally relates to the field of computer security, and specifically to systems, methods and computer program products for selecting synchronous or asynchronous file access method during antivirus analysis of the file.

BACKGROUND

In recent years, there has been a marked increase in the number of harmful programs, such as viruses, worms and Trojans and other types of malware. Malware causes significant damage and financial losses to businesses and individual computer users. One of the most effective methods of countering these threats is using antivirus software. The antivirus software detects and removes malicious programs from computers and protects computers and networks from spread of malware. To detect malicious programs, antivirus software performs individual file scans or comprehensive scans of files on computer or network drive.

Sometimes, antivirus software may access a file either synchronously or asynchronously during antivirus analysis of the file. Particularly, during the synchronous access, the antivirus software blocks any attempts by processes or threads of other programs to access the analyzed file until the antivirus analysis of the file is complete and the file is determined to be clean. During the asynchronous access, the antivirus software allows processes and threads of other programs to access the file while it is being analyzed by the antivirus software.

An additional antivirus scan may be necessary when, for example, a malicious program, which on the first antivirus scan was not detected by the antivirus software, infects a file on a user's computer. The first synchronous analysis of the file does not detect any malware and allows access to the program. Sometime later, the set of the malware signatures used by the antivirus software is updated, and the new signature set contains the signature of the missed malware. In cases like this, which happen rather often, all recently scanned files need to be rescanned again using the updated malware signature set. During the subsequent scan, the synchronous file access may not be most appropriate, as it affects the work of the user by suspending access to the files. Therefore, some antivirus programs perform asynchronous access to the file during subsequent scan, so that user can continue working with the file while it's being scanned by the antivirus software. Besides, if the file is clean, the antivirus software will allow other programs to access the file anyway. On the other hand, if the file is infected by a malware, the asynchronous access to the infected file in the subsequent antivirus scans does not affect the effectiveness of antivirus software, as the infected file has already been in use since the first antivirus scan and before update of the signature set, which gives malware enough time to perform malicious actions on the user's computer.

Therefore, there is a need for an effective mechanism for selecting whether to perform a synchronous or asynchronous access to computer files during antivirus analysis.

SUMMARY

Disclosed are systems, methods and computer program products for selecting synchronous or asynchronous file access method during antivirus analysis of files. In one example aspect of the invention, antivirus software detects an attempt to execute a file on a user's computer. The software collects information about current file attributes. The software also retrieves information about old file attributes. The software then compares current file attributes with old file attributes to determine whether the file has been modified. When the file is determined to be modified, the software synchronously accesses the file to perform antivirus analysis of the file. During the synchronous access of the file, one or more other programs are prohibited from accessing the analyzed file. When the file is determined to be unmodified, the antivirus software accesses the file asynchronously. During the asynchronous access of the file one or more of the other programs are allowed to access the analyzed file.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

DETAILED DESCRIPTION OF EXAMPLE EMBODIMENTS

Example embodiments of the present invention are described herein in the context of systems, methods and computer program products for selecting synchronous or asynchronous file access method during antivirus analysis of computer files by antivirus software. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

In one aspect, the antivirus software may access various software objects, such files, URLs, streams of data or the like, using synchronous or asynchronous access methods in order to perform antivirus analysis (or scan) of these objects. In the remainder of this discloser a file will be used as an example of the analyzed software object, however other types of software objects may be used. The antivirus analysis may include, but not limited to, signature analysis, heuristic analysis, behavior analysis or other known malware detection techniques.

Figure 1:
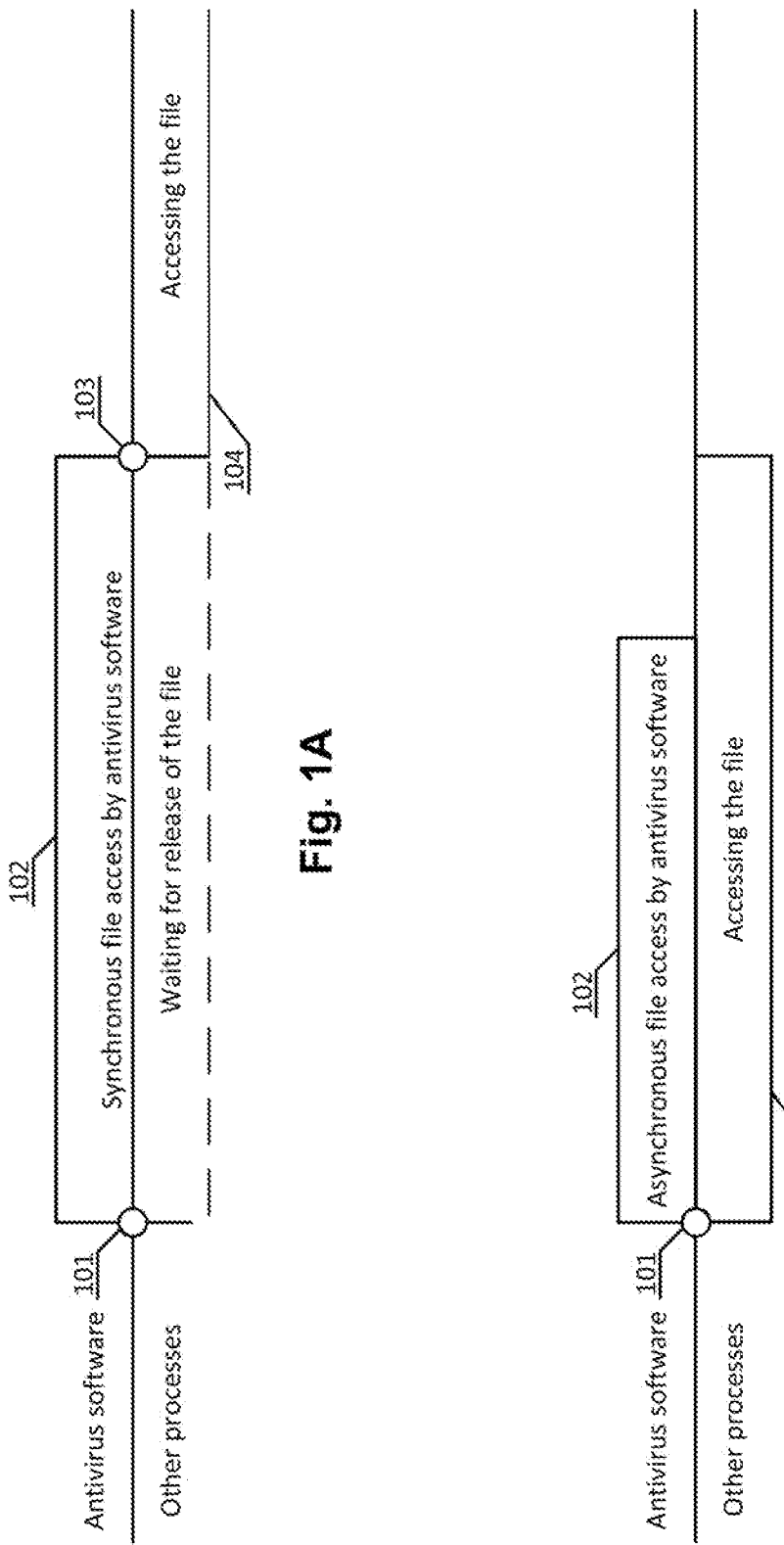
FIGS. 1A and 1B illustrate the synchronous and asynchronous file access methods.

FIG. 1A shows a diagram of interaction of the antivirus software and processes (or threads) of other programs during a synchronous file access. At point 101, antivirus software receives a command to analyze a file. This command could be initiated when, for example, a user attempts to open the file. During a synchronous file access by the antivirus software, other processes (or threads) accessing the file are stopped (suspended) during the time period 102, while the antivirus software performs antivirus analysis of the file. A process of a text editor application, such as Microsoft Word, can serve as an example of a process that access a file. When the antivirus software synchronously accesses a Word document, the text editor application waits for the antivirus software to finish analysis of the document at point 103 before the document is released by the antivirus software at point 104.

FIG. 1B shows a diagram of interaction of the antivirus software and processes of other programs during an asynchronous file access. At point 101, the antivirus software receives a command to analyze a file. During the asynchronous access, any process that requests access the file is allowed to do so during interval 104 while the file is being analyzed by the antivirus software. The antivirus software performs antivirus analysis 102 of the file simultaneously with and independent from processes (or threads) of other programs that also access the analyzed file. Using the above example of the text editor application, when the antivirus software and the text editor application asynchronously access a Word document, the text editor application can edit the document while antivirus software analyzes that document.

For example, in Windows OS environment, a process opens a file for asynchronous access in its call to CreateFile by specifying the FILE_FLAG_OVERLAPPED flag in the dwFlagsAndAttributes parameter. If FILE_FLAG_OVERLAPPED is not specified, the file is opened for synchronous access. When the file has been opened for asynchronous access, a pointer to an OVERLAPPED structure is passed into the call to ReadFile and WriteFile. When performing synchronous access, this structure is not required in calls to ReadFile and WriteFile.

In one example aspect, given the differences between synchronous and asynchronous file access methods, the antivirus software may start antivirus analysis of a file by selects one of the two file access methods. Such selection may be particularly useful when, regardless of the file access method, the antivirus analysis produces the same result (e.g., the analyzed file is determined to be either clean or malicious). In order to prevent the loading of a malicious file for the first time, the antivirus software may access file synchronously when the file is opened for the very first time. But in cases when the file has already been opened before, synchronicity of access may not be necessary, since the malicious code may be already working. Therefore, a few seconds delay provided by the synchronous access method will not prevent infection of the file. Using appropriate file access method, it is possible to decrease unnecessary blocking of applications and system processes by the antivirus software, which would, in turn, improve efficiency of the antivirus software and the computer system as whole.

In one aspect, taking in consideration specificities of the antivirus software, it is possible to select the most appropriate file access method based on statistical information about files that were previously scanned by the antivirus software. For instance, some antivirus programs calculate and collect checksums (e.g., hashes) of the scanned files, which can be used to choose an appropriate file access method. For instance, taking in the account what file was changed and when can be used to select asynchronous file access method on files that were not previously (or recently, e.g., within several days) modified. On the other hand, when the collected information about the file indicates that the file has been previously (or recently, e.g., within several days) modified, then a synchronous file access method may be more appropriate to analyze such files. In one aspect, the greater amount of collected information on the files would provide for better determination of the appropriate file access method.

Figure 2:
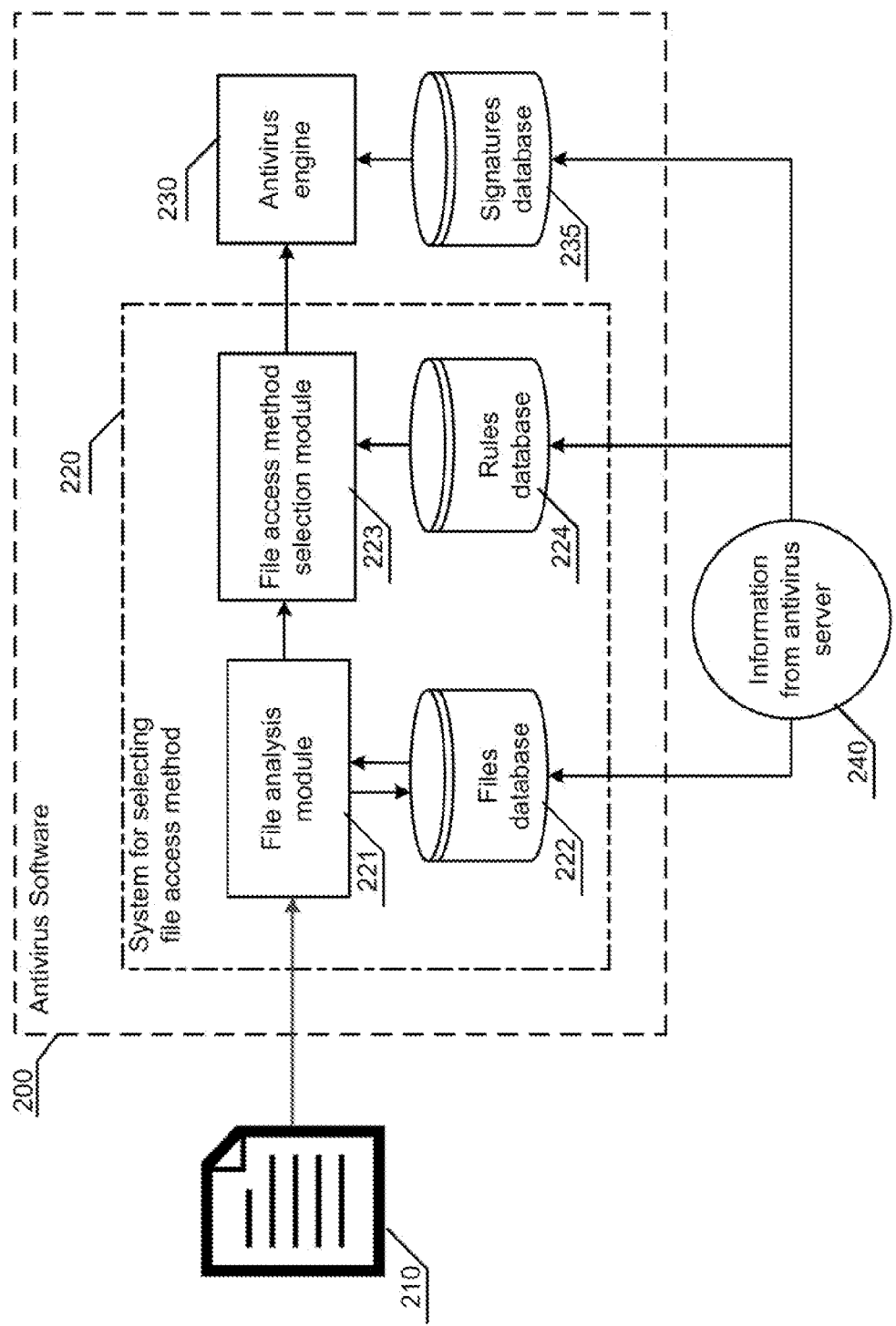
FIG. 2 illustrates a high-level diagram of one example embodiment of the implementation of the antivirus software.

FIG. 2 shows a high-level diagram of one example embodiment of the implementation of the antivirus software 200. The antivirus software 200 includes a system for selecting file access method 220 that selects a synchronous or asynchronous file access method, an antivirus engine 230 that performs an antivirus scan of the file, such as signature analysis, and a signature database 235 used by the antivirus engine 230 during signature analysis. In one example embodiment, the system for selecting file access method 220 includes a file analysis module 221, a files database 222, file access method selection module 223, and a rules database 224. At the attempt to access the file 210, the file is analyzed by the file analysis module 221, which determines the identifier (e.g., file name) and the current values of file attributes. In one example embodiment, file attributes can include, but not limited to: the date of the last antivirus scan of the file; the date of the signature database update used in the last antivirus scan; NTFS identifier of the file; the control sum of the file, etc. Any hash sum or any other information, that uniquely identifies the file, could be used as a file identifier.

Having identified the values of current file attributes, the file analysis module 221 is configured to research for the old values of the file attributes in the files database 222 using the file's identifier. File analysis module 221 then compares the old values of file attributes with the current values to identify changes to the file. File analysis module 221 then transfers information about file changes to the module 223. File analysis module 221 may also update the values of the file attributes in the files database 222 with the current values. If the analyzed file is not found in the database 222 using its identifier, the file analysis module 221 may determine current values of file attributes, create a new file entry for the file in the database 222, and record current values of the file attributes in the database 222.

In one example embodiment, the file access method selection module 223 determine whether to use synchronous or asynchronous file access method for antivirus analysis of the file by comparing changes to the file to the rules specifying what file access method should be used based on the totality of changes to the file. In one aspect, when the file is determined to be modified, the module 223 may select a synchronous file access method to perform antivirus analysis of the file. During the synchronous access of the file other programs may be prohibited from accessing the analyzed file. In another aspect, when the file is determined to be unmodified, the module 223 may select an asynchronous file access method to perform antivirus analysis of the file. During the asynchronous access of the file other programs may be allowed to access the analyzed file. After the type of the file access method is selected by module 223, the file with the parameter of the selected file access methods is sent to the antivirus engine 230. The antivirus engine 230 access the file using the selected file access method and performs antivirus analysis of the file using for example, signature analysis, heuristic analysis, emulation analysis or other malware detection methods.

The files database 222 and the rules database 224 can be implemented using various database architectures, such as hierarchical databases (e.g., IMS, TDMS, System 2000), network databases (e.g., Cerebreum, Cronospro, DBVist), relational databases (e.g., DB2, Informix, Microsoft SQL Server), object oriented databases (e.g., Jasmine, Versant, POET), object-relational databases (e.g., Oracle database, PostgreSQL/J), functional database, etc. Also, the file database 222 and rules database 224 can be filled with data from the antivirus server 240.

Figure 3:
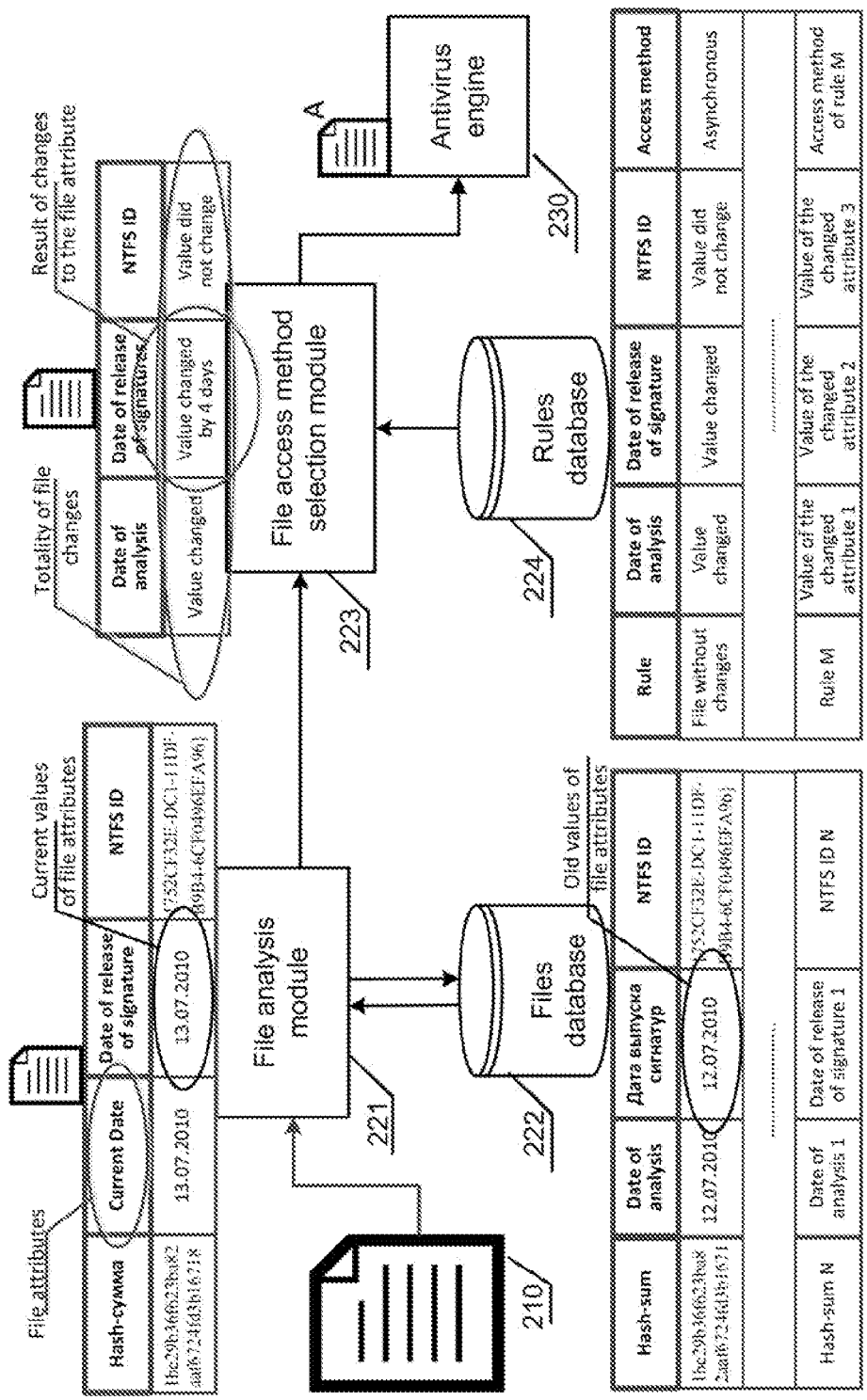
FIG. 3 illustrates a more detailed diagram of operation of one example embodiment of a system for selecting file access method of the antivirus software.

FIG. 3 shows a more detailed diagram of operation of one example embodiment of a system for selecting file access method used by the antivirus software of FIG. 2. The files database 222 contains identifiers and attributes for previously scanned files. The file analysis module 221 may be activated by the antivirus software 200 when file 210 is accessed (e.g., loaded or executed) on the computer. The file analysis module 221 calculates the hash sum of the file that is being analyzed and determines the current attributes of this file. After that, the file analysis module 221 searches for the old values of the file attributes in the files database 222. In case the information about the file is found in the files database using file's hash sum, the file analysis module 221 compares current values of file attributes with old values of file attributes, and, based on comparison, identifies which file attributes have changed. Module 221 collects information about changed attributes and transfers it to module 223. After the transfer, the file analysis module 221 updates file attributes in the database 22 with the current values of file attributes. The module 223 in turn identifies the correspondences between the totality of file attribute changes (e.g., one or more attribute changes) with the rules of selecting the appropriate file access method. In one aspect, each rule defines a set of file attribute changes, which are used to determine the optimal type of file access method.

Different types of rules can be used to determine different file access methods. For example, some rules can select file access method based on the date of release of the signature database used by the antivirus engine 230. In this case, if the date of last scan and the date of release of the malware signatures differ substantially (e.g., several months), the rules may require synchronous file access during antivirus analysis because the likelihood that the file may have been infected by malware is great when file has not been scanned for a long time. Conversely, if the date of last scan and the date of release of the malware signatures do not differ substantially (e.g., several days or weeks) the rules may allow asynchronous file access during antivirus analysis. In another example, different rules may be used to select file access method based on the change in location of the file. In this case, if the location attribute of file's NTFS ID has changed, but file ID remains the same, the rules may allow asynchronous file access. In yet another example, other rules can be used to select file access method based on the number of copies of file in the system. In this case, if the number of copies of the file has changed substantially (e.g., 3 or more) since the last antivirus check, the rules may require synchronous file access during antivirus analysis to perform a more detailed analysis of the file and its suspicious behavior.

After the file access method selection module 223 has selected the type of file access method, the module 223 assigns the parameter of the file access method (e.g., synchronous or asynchronous) and transfers the file to the antivirus engine 230 for analysis.

Figure 4:
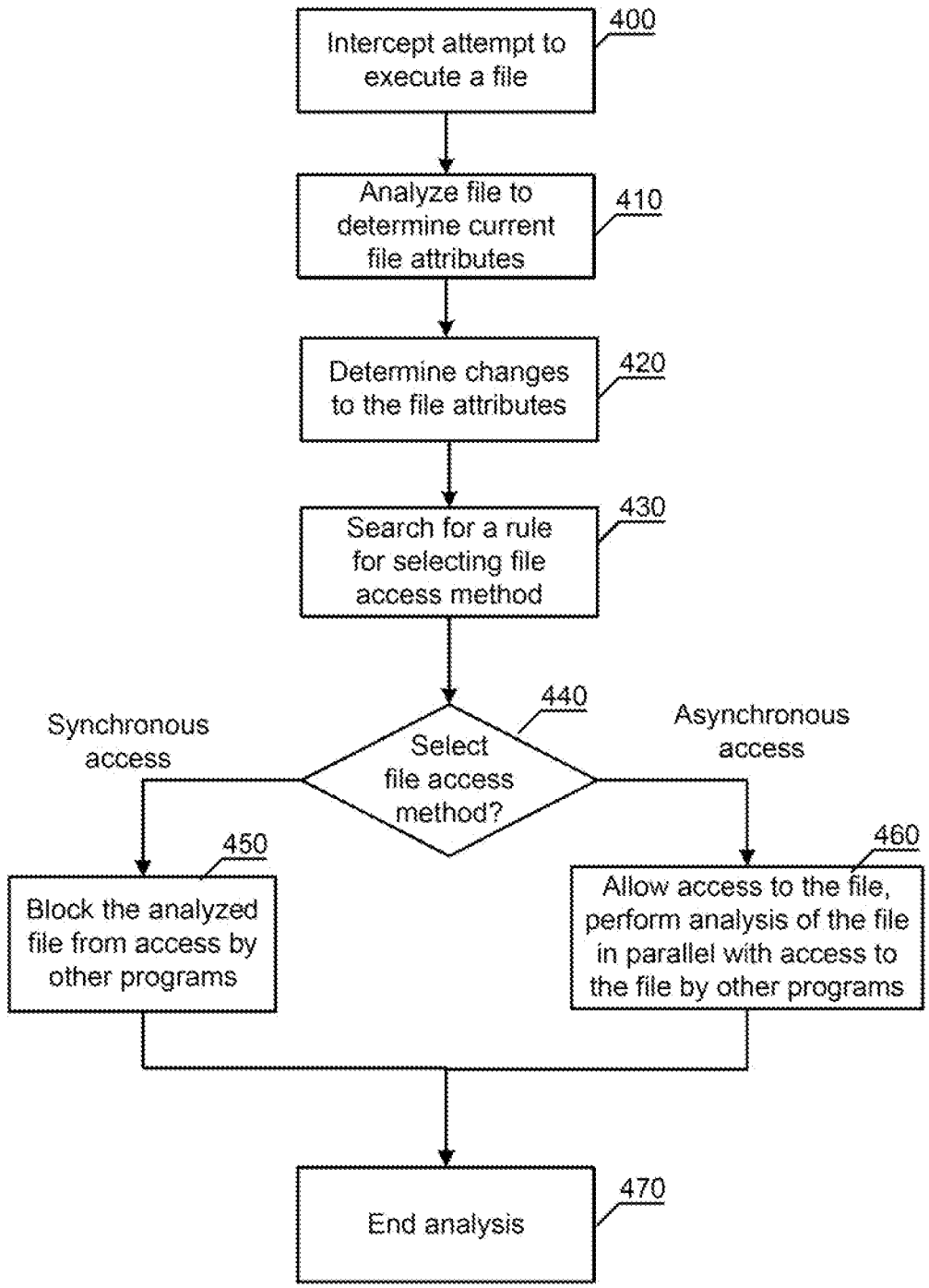
FIG. 4 illustrates a flow diagram of an example method of selecting file access method.

FIG. 4 shows an example method of selecting a file access method implemented by the antivirus software of FIGS. 2 and 3. At step 400, the antivirus software intercepts attempt to execute a file on the user's computer. At step 410, the file analysis module 221 analyzes the file and determines the identifier and the current values of different file attributes. At step 420, the module 221 uses the identifier to search for the old values of the file attributes in the files database 222, determines the changes to the file attributes, and transfers this information to the file access method selection module 223. Module 221 also updates the values of the file attributes, if they have changed, in the files database 222. At step 430, the file access method selection module 223 researches for the correspondences between the totality of file changes (e.g., one or more changes in the file attributes) with the rules in database 224. These rules choose the appropriate file access method for the antivirus analysis of the file based on whether the file is modified or not. If at step 440, a synchronous file access method is selected, at step 450, the antivirus software blocks the file from access by other processes and performs antivirus analysis of the file using antivirus engine 230. if at step 440, an asynchronous file access method is selected for the file, at step 460, the antivirus application allows access to the file to other processes while the file is analyzed by the antivirus engine 230. At step 470, the antivirus software finished analysis of the file and if the file is determined to be malicious takes appropriate remedial actions, such as quarantining, repairing or deleting the file.

Figure 5:
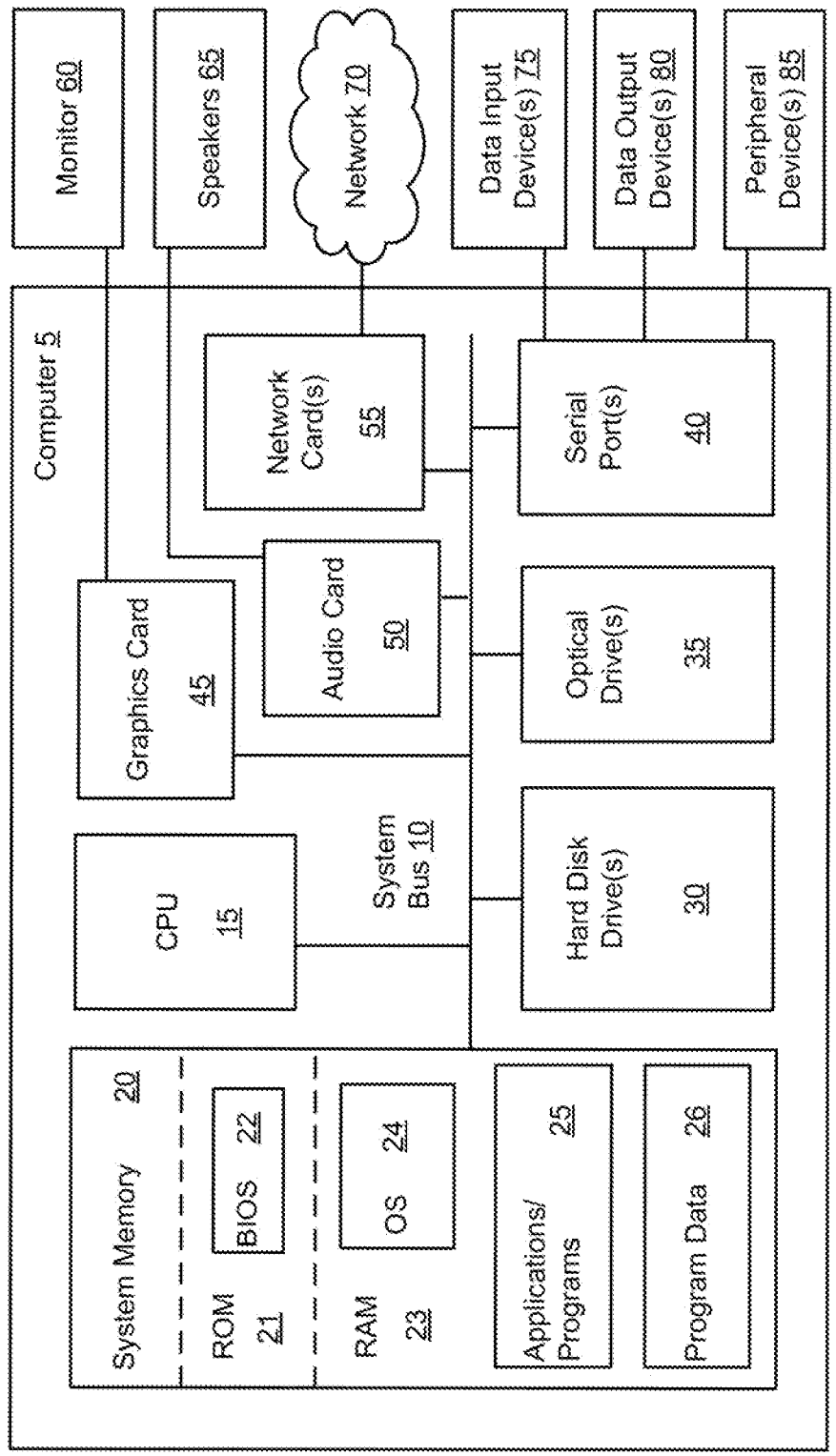
FIG. 5 illustrates a block diagram of a general-purpose computer suitable for implementing a system for performing antivirus analysis of file according to disclosed methods.

FIG. 5 depicts one example embodiment of a computer system 5 that could be used to implement the systems and methods for antivirus analysis of computer files shown in FIGS. 1-4. The computer system 5 may include, but not limited to, a personal computer, a notebook, tablet computer, a smart phone, a network server, a router, or other type of processing device. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A computer-implemented method for performing antivirus analysis of a file, comprising:
    detecting, by a hardware processor, an attempt to execute the file on a computer;
    collecting an identifier of the file and one or more current attributes of the file;
    using the identifier to search in a data store for one or more old attributes of the file;
    comparing one or more of the current attributes of the file with one or more of the old attributes of the file found in the data store to determine whether the file is modified;
    selecting a synchronous file access method or an asynchronous file access method for the antivirus application to perform antivirus analysis of the file based on the determination of whether the file is modified or unmodified; and
    when the file is determined to be modified, synchronously accessing the file by an antivirus software to perform antivirus analysis of the file, wherein during the synchronous access of the file one or more other programs are prohibited from accessing the analyzed file;
    when the file is determined to be unmodified, asynchronously accessing the file by the antivirus software to perform antivirus analysis of the file, wherein during the asynchronous access of the file one or more of the other programs are allowed to access the analyzed file.

2. The method of claim 1, wherein a file is determined to be modified when one or more current attributes of the file differ substantially from one or more old attributes of the file.

3. The method of claim 2, further comprising, when the file is determined to be modified, updating the data storage with the current attributes of the file.

4. The method of claim 1, wherein a file is determined to be unmodified when one or more current attributes of the file do not differ substantially from one or more old attributes of the file.

5. The method of claim 1, wherein an identifier of the file includes a hash-sum of the file.

6. The method of claim 1, wherein one or more file attributes include one or more of a checksum of the file, date of the last antivirus analysis of the file, date of release of the antivirus signatures used in the last antivirus analysis of the file, and NTFS identifier of the file.

7. A system for performing antivirus analysis of a file, the system comprising:
    a data store for storing a plurality of attributes of a plurality of computer files;
    a hardware processor coupled to the data store and configured to:
        detect an attempt to execute the file on a computer;
        collect an identifier of the file and one or more current attributes of the file;
        use the identifier to search in a data store for one or more old attributes of the file;
        compare one or more of the current attributes of the file with one or more of the old attributes of the file found in the data store to determine whether the file is modified;
        select a synchronous file access method or an asynchronous file access method for the antivirus application to perform antivirus analysis of the file based on the determination of whether the file is modified or unmodified; and when the file is determined to be modified, synchronously access the file by an antivirus software to perform antivirus analysis of the file, wherein during the synchronous access of the file one or more other programs are prohibited from accessing the analyzed file;

when the file is determined to be unmodified, asynchronously access the file by the antivirus software to perform antivirus analysis of the file, wherein during the asynchronous access of the file one or more of the other programs are allowed to access the analyzed file.

8. The system of claim 7, wherein a file is determined to be modified when one or more current attributes of the file differ substantially from one or more old attributes of the file.

9. The system of claim 8, wherein the processor further configured to, when the file is determined to be modified, update the data storage with the current attributes of the file.

10. The system of claim 7, wherein a file is determined to be unmodified when one or more current attributes of the file do not differ substantially from one or more old attributes of the file.

11. The system of claim 7, wherein the file identifier includes a hash-sum of the file.

12. The system of claim 7, wherein one or more file attributes include one or more of a checksum of the file, date of the last antivirus analysis of the file, date of release of the antivirus signatures used in the last antivirus analysis of the file, and NTFS identifier of the file.

13. A computer program product embedded in a non-transitory computer-readable storage medium, the computer program product comprising computer-executable instructions for performing antivirus analysis of a file, including instructions for:

detecting an attempt to execute the file on a computer;

collecting an identifier of the file and one or more current attributes of the file;

using the identifier to search in a data store for one or more old attributes of the file;

comparing one or more of the current attributes of the file with one or more of the old attributes of the file found in the data store to determine whether the file is modified;

selecting a synchronous file access method or an asynchronous file access method for the antivirus application to perform antivirus analysis of the file based on the determination of whether the file is modified or unmodified; and when the file is determined to be modified, synchronously accessing the file by an antivirus software to perform antivirus analysis of the file, wherein during the synchronous access of the file one or more other programs are prohibited from accessing the analyzed file;

when the file is determined to be unmodified, asynchronously accessing the file by the antivirus software to perform antivirus analysis of the file, wherein during the asynchronous access of the file one or more of the other programs are allowed to access the analyzed file.

14. The product of claim 13, wherein a file is determined to be modified when one or more current attributes of the file differ substantially from one or more old attributes of the file.

15. The product of claim 14, further comprising instructions for, when the file is determined to be modified, updating the data storage with the current attributes of the file.

16. The product of claim 13, wherein a file is determined to be unmodified when one or more current attributes of the file do not differ substantially from one or more old attributes of the file.

17. The product of claim 13, wherein an identifier of the file includes a hash-sum of the file.

18. The product of claim 13, wherein one or more file attributes include one or more of a checksum of the file, date of the last antivirus analysis of the file, date of release of the antivirus signatures used in the last antivirus analysis of the file, and NTFS identifier of the file.

* * * * *